May 23, 1944.　　F. H. GULLIKSEN　　2,349,656
REGISTER CONTROL SYSTEM
Filed Sept. 7, 1939　　4 Sheets-Sheet 1

WITNESSES:

INVENTOR
Finn H. Gulliksen.
BY
Paul E. Friedemann
ATTORNEY

May 23, 1944.   F. H. GULLIKSEN   2,349,656
REGISTER CONTROL SYSTEM
Filed Sept. 7, 1939   4 Sheets-Sheet 2
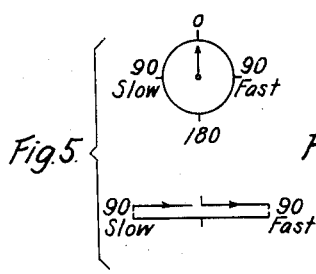
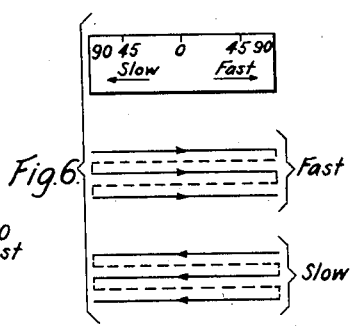
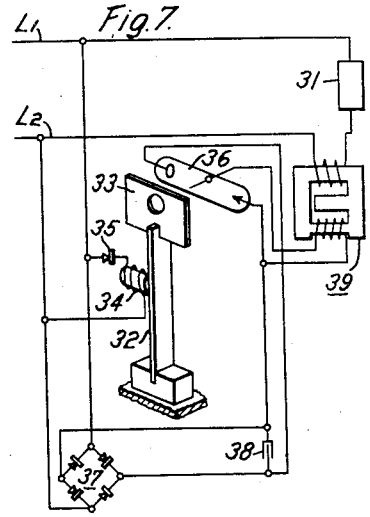
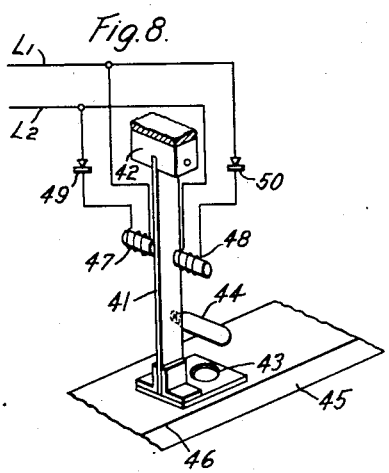
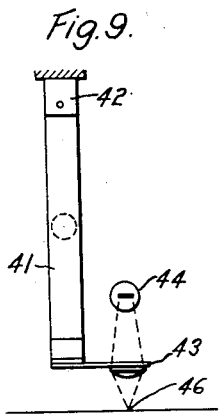
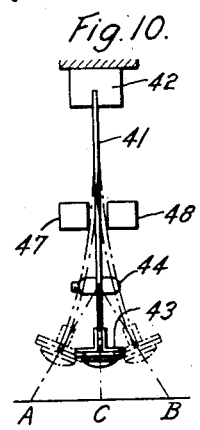
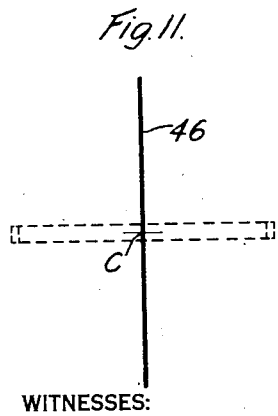
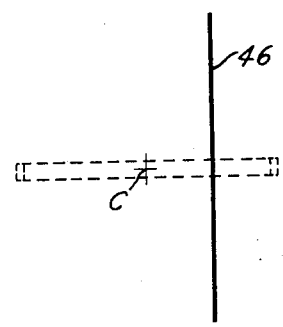
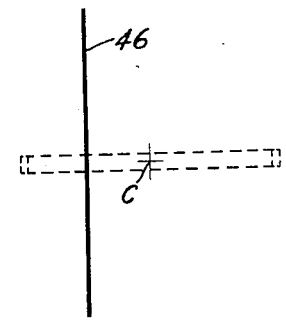
INVENTOR
Finn H. Gulliksen.
BY
Paul E. Friedemann
ATTORNEY May 23, 1944.   F. H. GULLIKSEN   2,349,656
REGISTER CONTROL SYSTEM
Filed Sept. 7, 1939   4 Sheets-Sheet 3

INVENTOR
Finn H. Gulliksen.
BY
Paul E. Friedemann
ATTORNEY

May 23, 1944.  F. H. GULLIKSEN  2,349,656
REGISTER CONTROL SYSTEM
Filed Sept. 7, 1939  4 Sheets-Sheet 4
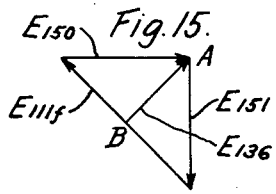
Fig. 15.
| a | | b |
|---|---|---|
| 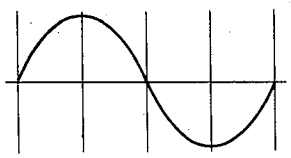 | Fig. 16.<br>A.C. Supply<br>Voltage. | 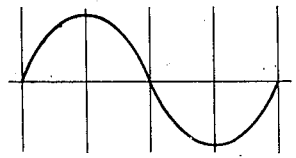 |
| 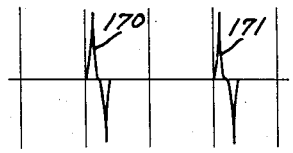 | Fig. 17.<br>Impulse Volts. |  |
| 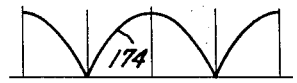 | Fig. 18.<br>Rectox Volts. | 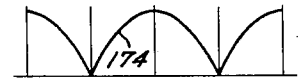 |
| 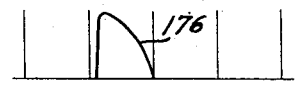 | Fig. 19.<br>Resistor Volts. | 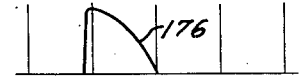 |
| 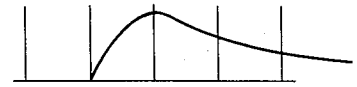 | Fig. 20. | 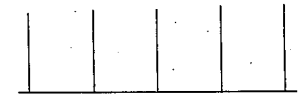 |
| 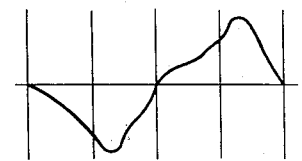 | Fig. 21.<br>Output Volts. | 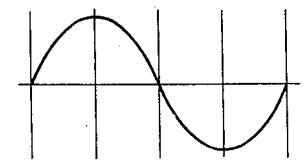 |
WITNESSES:
Wm. B. Sellers.
INVENTOR
Finn H. Gulliksen.
BY Paul E. Friedemann
ATTORNEY Patented May 23, 1944

2,349,656

UNITED STATES PATENT OFFICE 2,349,656

REGISTER CONTROL SYSTEM

Finn H. Gulliksen, Pittsburgh, Pa., assignor to Westinghouse Electric & Manufacturing Company, East Pittsburgh, Pa., a corporation of Pennsylvania Application September 7, 1939, Serial No. 293,724

3 Claims. (Cl. 88—14)

My invention relates broadly to synchronizing apparatus useful, for example, in a register regulator and which includes a vibrating reed which is not only synchronized but polarized with respect to an alternating current source.

An object of my invention is to provide a register regulator having a substantially inertialess vibrating reed which is polarized with respect to an alternating current source. of one or more rectifiers.

Another object of my invention is to provide a register regulator having a vibrating reed which is polarized with respect to an alternating current source by means of one or more rectifiers.

Other objects and advantages will become more apparent from a study of the following specification when considered in conjunction with the accompanying drawings, in which:

Fig. 5 is a schematic showing of a standard synchroscope dial together with a corresponding straight line dial, the latter being useful in the device shown in Fig. 4;

Fig. 6 is a schematic showing of a straight line dial and patterns of the traveling beam which indicate either fast or slow, that is, leading or lagging phase angle between two alternating current sources;

Fig. 7 is a schematic showing of a power factor meter embodying a polarized reed in accordance with my invention;

Fig. 8 is a perspective view of a photo-electric scanning device useful in a register control apparatus such as shown in Fig. 14;

Fig. 9 is a side view of the scanner shown in Fig. 8;

Fig. 10 is a front view of the scanner shown in Fig. 8;

Figure 14:
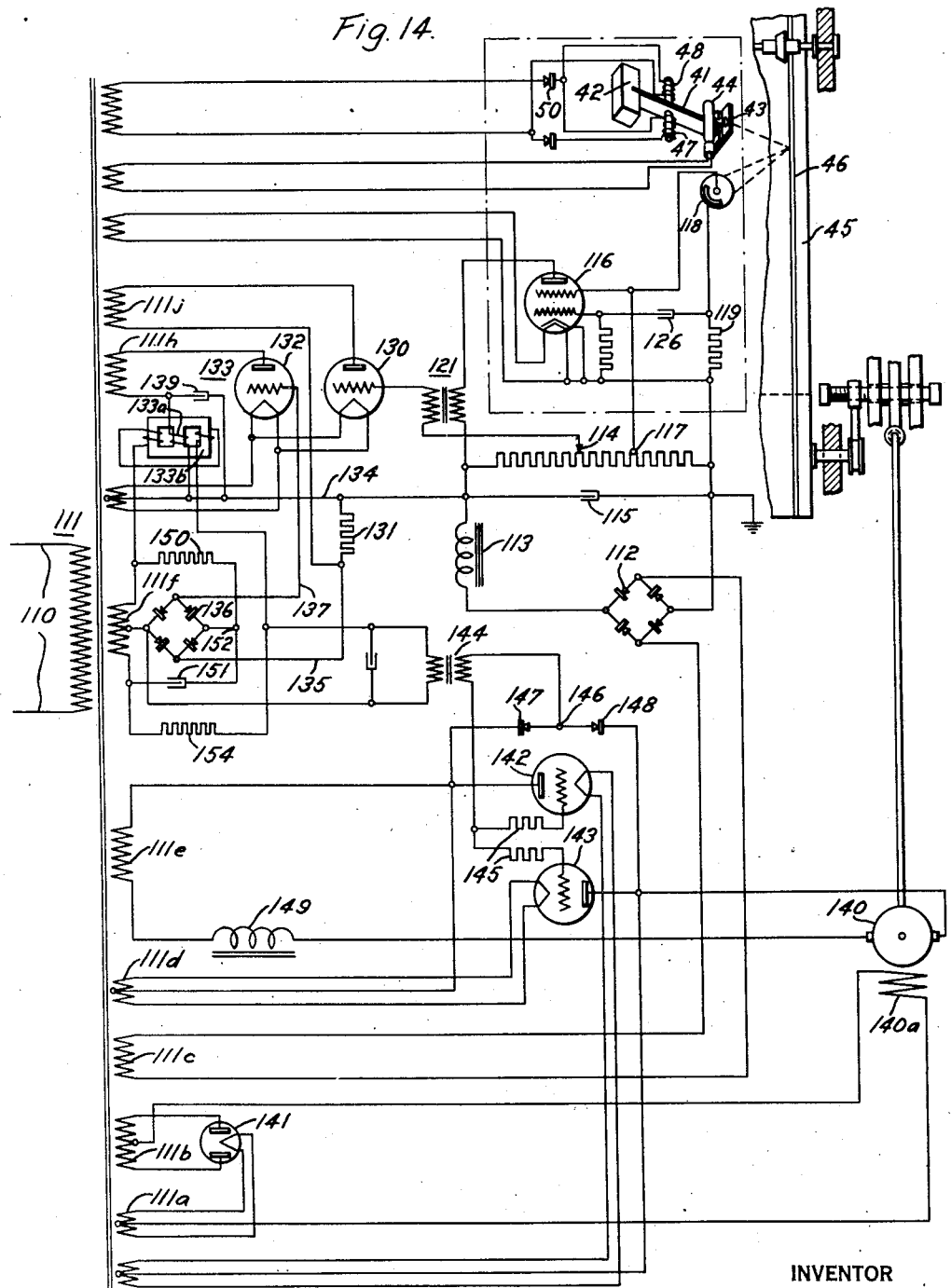

Figs. 11, 12, and 13 show various relative positionings of the vibrating reed with respect to the index line on a traveling strand or web of sheet material;

Fig. 14 shows a register control system embodying a polarized vibrating reed in accordance with my invention;

Fig. 15 is a vector diagram illustrating the angular relation between the applied voltage and the derived voltage of a split phase circuit employed in the system of Fig. 14;

Figs. 16 to 21 (a and b) inclusive, illustrate the relations between certain voltages employed and developed in the system shown in Fig. 14.

It is a well known fact that most synchroscopes now on the market have a considerable amount of inertia and will, therefore, not follow rapid changes in beat frequency. This condition is particularly objectionable when synchronizing generators driven by propeller type waterwheels because the speed regulation of this type of equipment is poor, particularly at low heads of water. There have been applications, where, due to rapid variations or reversals of beat frequency, the synchroscope has temporarily lagged as much as 30 degrees from the correct position, and this condition is, of course, objectionable if manual synchronizing is used in the station.

If a synchroscope be designed on the mechanical differential principle, i. e., arranging a mechanical differential driven by two synchronous motors connected to the bus and the line respectively, a practically inertialess synchroscope can be built. It would, however, be necessary to provide means so that the synchronous motors always pulled in with the rotor in the same position relative to the stator winding, and not 180 degrees out of phase. This necessitates the use of a commutator on the motor shaft, operating in connection with relays to assure correct phase angle indications. Such a synchroscope would be too bulky and expensive and is, therefore, not practicable.

Figure 1:
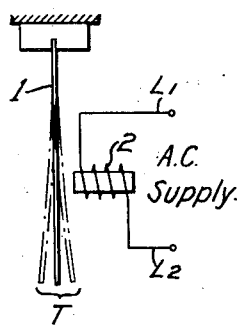
Figure 1 is a schematic showing of a vibrating reed which is not polarized.

If, as shown in Fig. 1, a piece of steel 1 or other magnetic material having one of its ends anchored is placed in an alternating current magnetic field produced by magnet 2 energized by a suitable alternating current source of supply $L_1$—$L_2$, the travel T of the free end of the piece of steel has a definite relation to the alternating current supply voltage wave.

Figure 2:
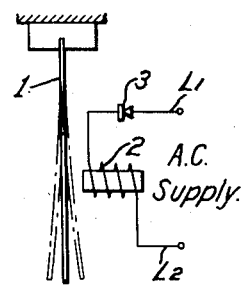
Fig. 2 is a schematic showing of a vibrating reed which is polarized by means of a half-wave rectifier.
Figure 3:
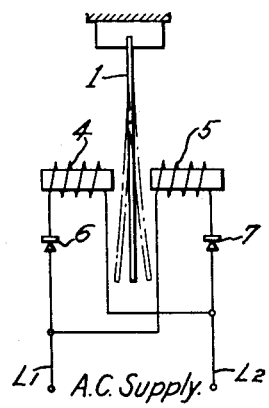
Fig. 3 is a schematic showing of a vibrating reed which is polarized by means of two half-wave rectifiers.

The arrangement shown in Fig. 1 has the same defect as the synchronous motor scheme with respect to the "pull in" position. In order to synchronize the reed in the correct "pull in" position and in accordance with my invention, an arrangement as shown in Fig. 2 or Fig. 3 is used. By connecting a half-wave rectifier 3 such as a "rectox" in series with the magnet coil 2 (see Fig. 2), the reed is attracted towards the magnet only when the voltage of $L_1$ is positive in relation to $L_2$. In Fig. 3 is shown an arrangement comprising two magnets 4 and 5 energized through "rectox" rectifiers 6 and 7, respectively, during the positive and the negative half cycle of alternating current voltage respectively.

Experiments showed that preferably the reed should be designed so that its critical frequency is slightly higher than the operating frequency, although satisfactory operation is also obtained at the tuned frequency provided the damping produced by the air is sufficient to limit the deflection of the reed so as to keep the mechanical stresses within permissible limits.

Figure 4:
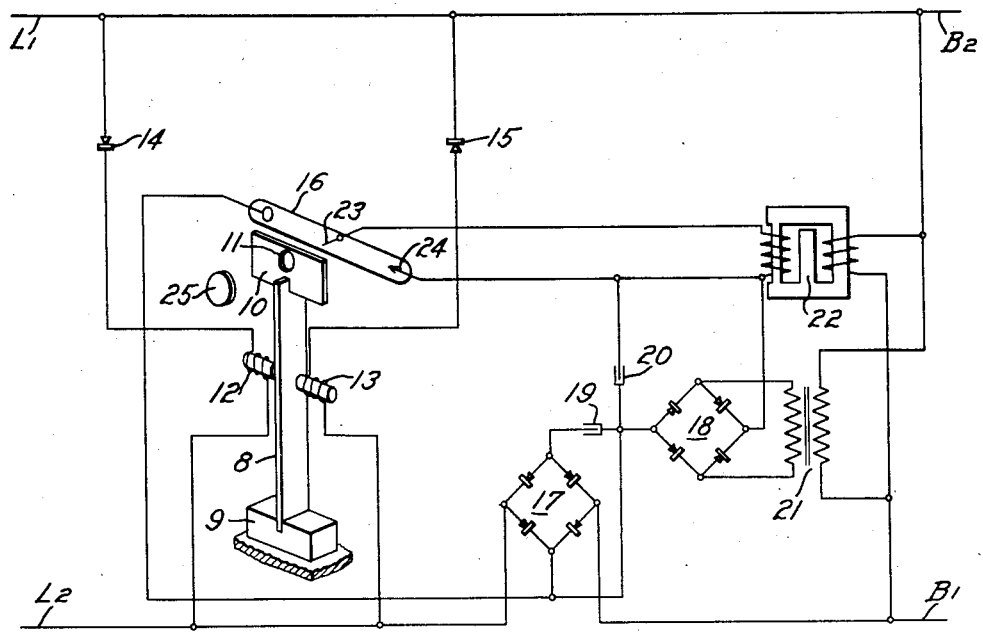
Fig. 4 is a schematic showing of a synchroscope embodying a polarized reed similar to that shown in Fig. 3.

Using the polarized reed principle, a novel type of synchroscope as shown in Fig. 4 may be devised. The synchroscope consists of a reed 8 which is anchored at 9. The reed is equipped with a thin plate 10 which has a small hole 11 therein. The magnets 12 and 13 are energized from the line through "rectox" rectifiers 14 and 15, respectively. As previously described, the reed 8 will vibrate in synchronism with the line voltage $L_1$ and $L_2$, and the hole in plate 10 will always be in a definite location dependent upon the phase angle of the line voltage $L_1$—$L_2$.

A glow tube 16, preferably a Strobotron tube or a tube with similar characteristics, is placed behind plate 10 so that the glow from the tube can be seen through the hole 11. The anode voltage for tube 16 is supplied by "rectox" rectifiers 17 and 18 whose output voltages are smoothed out by means of condensers 19 and 20, respectively. Rectox rectifier 17 is supplied with alternating current beat voltage connected in "bright lamp" circuit, and rectifier 18 whose output voltage is opposing the voltage from rectifier 17 is connected to transformer 21 which is connected to the bus voltage $B_1$—$B_2$. An impulse transformer 22 is also connected across the bus voltage and the secondary winding of the impulse transformer is connected to the grid 23 and the cathode 24 of the tube 16.

The purpose of tube 16 is to supply a luminous discharge of high intensity and short duration during each cycle. This discharge will occur at a definite phase angle location (referring to the voltage across buses $B_1$—$B_2$) once during each cycle of bus voltage, and is initiated by the grid control action of impulse transformer 22.

When the line voltage is in phase with the bus voltage the tube discharge occurs when the reed, and consequently the hole 11 is in the center position as shown in Fig. 4, and an illuminated spot will therefore appear on a translucent glass dial 25 placed in front of plate 10. If the line voltage is out of phase with the bus voltage the illuminated spot appears either on the left side or on the right side of the center position, depending upon whether the bus voltage is leading or lagging the line voltage.

In order to explain the operation of the device reference is made to Fig. 5 which shows a standard synchroscope dial and the corresponding straight line dial as used in Fig. 4. Assuming that the phase angle is zero and then changes in the fast direction to 90—180—270 and back to zero, the light spot would move as shown in the lower part of Fig. 5, and it will be seen that the light spot appears in the center location if the phase angle is zero as well as 180. To make the synchroscope indicate only the zero position, and to also indicate whether the machine is fast or slow the tube 16 is prevented from glowing when the phase angle changes from 90 to 180 to 90. This feature is obtained by opposing the anode beat voltage obtained from the rectifier 17 by the voltage from rectifier 18 so that if the phase angle difference between line and bus exceeds 90° the total anode potential of tube 16 will be too low to cause breakdown of the tube regardless of the magnitude of the grid voltage obtained from impulse transformer 22.

This arrangement results in the dial patterns shown in Fig. 6. When the machine is fast the light spot appears only when moving from left to right. When the machine is slow the visible light spot movement is only from right to left.

The polarized reed such as shown in Fig. 2 is also applicable to a power factor meter, such as shown in Fig. 7. In many industrial applications rapid variations of power factor occur, and no instrument is available to indicate these rapid variations because of the mechanical inertia of the moving mechanism of the instrument. For this reason it is often necessary to make expensive oscillograph tests to determine the variations in power factor, where an ordinary instrument would have been entirely satisfactory provided the instrument did not have any mechanical lag.

Fig. 7 shows a power factor meter which (1) will give instantaneous indication of power factor, (2) which is simple to operate and read, (3) which can be built into a standard instrument case, and (4) which will not be more expensive than the standard power factor meters now on the market.

Referring to Fig. 7, the load 31 whose power factor is to be measured is connected across an alternating current source $L_1$—$L_2$. A vibrating reed 32 with characteristics as described above is equipped with a thin plate 33 in which is a small hole. Polarized synchronous operation of the reed is obtained by means of magnet 34 and "rectox" rectifier 35. Glow discharge tube 36, which preferably is a cold cathode tube, for example a Strobotron, is supplied with direct current anode potential by means of "rectox" rectifier 37 connected to voltage $L_1$—$L_2$. A condenser 38 is connected across the "rectox" rectifier to give a discharge current of high magnitude and short duration through tube 36. The grid circuit of tube 36 is controlled by means of an impulse transformer 39 excited from the load current. This impulse transformer produces a peaked voltage which has a definite phase relation to the load current wave. For this reason, the tube illuminates the hole when the load current has a definite phase angle, and through the stroboscopic action of the vibrating reed, the phase angle can be read directly as outlined in detail above in the description of the synchroscope.

Because of the polarizing action of "rectox" rectifier 35 the hole, when illuminated, will be located on the left hand side if the power factor is leading, and will be on the right hand side if the power factor is lagging.

In my formerly filed copending application, Serial No. 212,521, entitled "Registration control system" filed June 8, 1938, which has matured into Patent No. 2,208,420, issued July 16, 1940, and of which this application is a "continuation in part," I have described a slitter regulator embodying a scanner which scanner comprises a synchronous motor and four rotating lenses. Such type of scanner is quite expensive. I propose to substitute for such scanner the scanner shown in Figs. 8, 9 and 10 which is not only less expensive but more satisfactory in operation.

Referring to Figs. 8, 9 and 10 a reed 41 is clamped securely at 42. A lens 43 is mounted at the end of reed 41 as shown, and a lamp 44 is arranged so that a spot of light is focused on the paper 45 or other sheet material on which is printed the line 46. The two magnets 47 and 48 are energized by "rectox" rectifiers 49 and 50 which are connected to the alternating current supply source. The polarity of the "rectox" rectifiers is such that the reed is attracted to the right when $L_1$ is of positive polarity, and is attracted to the left when $L_2$ is positive relative to $L_1$. By this "rectox" arrangement it is assured that the travel of the reed will have a definite relation to the polarity of the alternating current supply source.

When the reed is operating at a frequency 25 to 5 per cent below the mechanically tuned frequency of the reed, the lens, and consequently the light spot focused on the paper will oscillate between limit positions A and B in Fig. 10. The light spot will be in the center position C, 90 degrees after the flux produced by magnet 47 equals the flux produced by magnet 48. If sufficient resistance be connected in series with the magnets to bring the magnet flux approximately in phase with the line voltage $L_1$—$L_2$, the center position of the light beam will be approximately 90 degrees displaced relative to the line voltage $L_1$—$L_2$ as required by the slitter control circuit which is shown in Fig. 14 which will be described. By suitable circuit adjustments, in various well known manners, for example by having a variable resistor in series with the magnets as explained above (not shown), proper adjustment of the phase angle displacement as required by the circuit operation can be obtained.

Tests with various reeds have shown that the relation between the alternating current supply voltage phase angle, and the neutral or center position of the reed (which is the indicating position) does not vary with the supply voltage, the supply frequency, or the mechanical characteristics caused by temperature variations. The arrangement shown in Figs. 8 and 9 therefore can replace the synchronous motor and the four lenses shown in my aforementioned copending application.

Fig. 11 shows line 46 in the center C of the path of vibration of reed 41 which is the normal or correct position of the line.

Fig. 12 shows line 46 too far to the right while Fig. 13 shows line 46 too far to the left of the path of vibration of reed 41 therefore showing an abnormal position of line 46 which requires correction.

The system shown in Fig. 14 is one which is identical to that described in my aforesaid copending application except that my novel type of polarized reed scanner is substituted for the scanner of said slitter. Operating energy for the control system is derived from an alternating current source 110, to which is connected the primary winding of a control transformer 111, having a number of secondary windings 111–a to 111–j, respectively, which are provided for purposes to be described. The secondary 111–c is connected to energize a rectifier bridge 112 from which a direct current voltage is available for the energization of the photo-tube detecting circuit. The bridge 112 is connected through a reactor 113 to a potentiometer resistor 114, and a condenser 115 is provided across resistor 114, to absorb the ripple direct currents. An amplifying tube 116 is connected across the terminals of the potentiometer resistor 114, the cathode of the tube being connected to the negative terminal, and the anode of the tube being connected to the positive terminal. The amplifying tube 116 is provided with a biasing grid that is connected to a negative point 117 on the potentiometer resistor 114.

A photo-tube 118 is connected in series with a resistor 119 between the negative terminal of the potentiometer resistor 114 and the point 117 on that resistor. A control grid of the amplifying tube 116 is connected through a condenser 120 to the juncture between the resistor 119 and the photo-tube 118. The plate circuit of the amplifying tube 116 includes the primary winding of a peaking transformer 121. The constants of the elements connected to the tube 116 are such as to maintain a constant plate current below the saturation point of its current curve. Any change in the plate current establishes a momentary rapid voltage change in the peaking transformer.

The photo-tube 118 is located adjacent the traveling material that is to be kept in line, so that the tube may respond to the degree of lighting in the lighted testing zone of the type illustrated in Figs. 8, 9 and 10. The scanner is identical to that shown in these figures, hence the various elements are referred to by the same reference numerals.

While the illumination of the photo-tube remains constant, the amplifying tube 116 will not be affected, but will operate on a fixed point of its current curve. The plate current through the amplifying tube 116 thus remains constant, and the peaking transformer 121 is not energized. Upon changes in the plate current of tube 116, the peaking transformer 121 becomes momentarily energized to generate an impulse voltage. That impulse voltage of the peaking transformer excites the grid of the discharge tube 130 and renders that tube conductive to transmit current if the current is of the proper polarity at that instant. The grid discharge tube 130 is connected in series with the secondary winding 111–j and a resistor 131. The grid circuit of the discharge tube 130 includes, in addition to the secondary winding of the peaking transformer 121, a portion of the potentiometer resistor 114, which portion serves as a source of biasing potential, normally to bias the grid of that tube 130, to block conduction in the tube 130.

When the voltage developed in the peaking transformer is effective to overcome the biasing voltage in the grid circuit, and the impressed voltage from the secondary winding 111–j is of such polarity that the anode of the tube 130 is positive, the tube 130 will be rendered conductive. The plate current will traverse the resistor 131 and will establish a drop of potential across that resistor which will serve for the time being as a biasing voltage to prevent conduction, under certain conditions, in a second grid discharge tube 132.

The plate circuit of the second grid discharge tube 132 is connected in series circuit relation with the secondary winding 111–h and a winding 133–a of a reactor 133. The grid control circuit of the second discharge tube 132 insofar as it is affected by the biasing resistor 131, may be traced from the cathode of grid discharge tube 132, a conductor 134, to the top of the resistor 131, through the resistor 131, through a conductor 135 to rectifier bridge 136 at secondary winding 111-f, through the bridge and a conductor 137 to the grid of the discharge tube 132. The voltage drop across the resistor 131 counteracts the voltage from the rectifier bridge 136 and thus controls the grid voltage either to block or to unblock the discharge tube 132 to prevent it from operating or to permit it to operate, according to whether the tube 130 is already energized or is not yet energized.

It might be well at this point to pass briefly to the part of the system which includes the restoral motor 140. That motor is provided with a shunt field winding 140-a which is constantly energized from the secondary winding 111-b through a double wave rectifier 141. Field rheostats are not shown. The armature of the restoral motor 140 is energized from the secondary winding 111-e through either of two discharge tubes 142 and 143. The discharge tubes 142 and 143 are reversely connected, in parallel with each other, so that each one will be able to transmit current waves of only one polarity, depending, of course, upon whether it is permitted to be conductive by the control circuit at that time to transmit such current wave.

The grid circuits for the two restoral discharge tubes 142 and 143 are controlled by a peaking transformer 144 whose secondary winding has one terminal connected to a balanced double resistor 145 connected between the two grids of the restoral tubes 142 and 143, and the other terminal of the peaking transformer secondary is connected to a mid-point 146 between two reversely connected, and opposing, rectifier units 147 and 148. In order to limit the current in the armature circuit of this restoral motor, a reactive device 149 is provided in that circuit.

The voltage of the peaking transformer 144 renders the restoral discharge tubes 142 and 143 selectively effective to energize the restoral motor, as the motor circuit polarity reverses. As such polarity of the motor circuit reverses, the restoral motor tubes 142 and 143 will tend to be available alternately for current conduction, according to such circuit polarity. The voltage of the transformer 144, however, will selectively render the tube 142 or 143 conductive to effect restoral action by the motor 140, according to the direction of deviation detected by the photocell and the subsequent energization of tube 130 or 132. The motor will thus be selectively energized to operate more in one direction than in the opposite direction, to effect restoral operation when the web material deviates from its path. Such control of the tubes 142 and 143 is established by means of a phase-shifting circuit that is controlled by the discharge tube 132, which will now be described.

In order better to understand the manner in which the phase-shifting circuit operates, the circuits connected to the secondary winding 111-f will be first considered.

The secondary winding 111-f has one phase-shifting circuit connected to its terminals which circuit includes a resistor 150 and a condenser 151. The voltage relationship in that circuit is schematically illustrated in the vector diagram in Fig. 15. As shown in that diagram, the voltage drop across the resistor 150 is represented by the vector E-150. The voltage drop across the condenser 151 is represented by the vector E-151. The voltage across the secondary winding 111-f, which is the applied voltage across the split-phase circuit, is represented by the vector E-111-f, and the juncture point 152, connecting the resistor 150 and the condenser 151, is subjected to a voltage E-136 at right angles to the applied voltage E-111-f of the secondary winding 111-f. The alternating voltage impressed upon the rectifier bridge 136, is represented by the vector E-136 between points A and B of the vector diagram in Fig. 15, and is thus 90° displaced from the voltage of the transformer secondary 111-f, and is similarly displaced from the voltage of the secondary 111-h. Thus, the rectified voltage derived from the rectifier 136 would normally induce conduction in grid discharge tube 132 at the 90° point of the voltage timing wave if the grid circuit of tube 132 were not otherwise biased to prevent conduction of the tube 132, by the drop across resistor 131.

As previously described, the grid discharge tube 130 has the resistor 131 connected in series with it. Consequently, when tube 130 is energized, resistor 131 will have a potential drop across it that will be in a direction to oppose and overbalance the rectifier voltage connected to the grid of the tube 132. If tube 130 is not energized and resistor 131 is not traversed by the plate current of the tube 130, the resistance value of the resistor 131 is sufficiently small to permit the rectifier voltage from rectifier 136 to energize and initiate the operation of discharge tube 132. Thus, by means of the resistor 131, an electrical interlock is established between the two grid discharge tubes 130 and 132 in such manner that tube 132 cannot be rendered conductive whenever tube 130 has already been rendered conductive.

Because of the characteristics of tubes 130 and 132, however, there is more to be considered in the effectiveness of the rectifier 136 and of the resistor 131 in controlling the tubes 142 and 143. As previously explained the characteristics of tubes 130 and 132 are such that, once the tube has been rendered conductive, it will remain conductive, even if a biasing voltage should be applied immediately thereafter and before the end of the current wave, and even though the biasing voltage would be capable of blocking conduction when conduction had not yet been established. The resistor 131, (through tube 130) and the rectifier 136 are thus provided and are effective to control the tube 132 in accordance with the location of the guide line on one side or on the other side of its normal neutral position. Such selective detection and operation are achieved according to the chronological effectiveness of the voltage established by the rectifier 136 and the voltage established across the resistor 131.

Thus, if tube 130 is energized by peaking transformer 121, with a consequent immediate voltage drop across resistor 131, before the rectifier 136 is effective to energize the grid of tube 132 for conduction, the tube 132 will be blocked against operation by the voltage drop across the resistor 131, and the voltage across the rectifier 136 will be ineffective to operate the tube 132.

If, however, the rectifier is effective to energize tube 132 before peaking transformer 121 energizes tube 130, tube 132 will be energized and rendered conductive before the voltage drop across resistor 131 may block the tube 132. Once the tube 132 is rendered conductive, it is immaterial that resistor 131 becomes energized to apply a biasing voltage that would otherwise be effective to block the tube 132 against operation.

The chronological timing between the voltage of rectifier 136 and the voltage across resistor 131, is thus controlled by the time when the peaking transformer 121 is energized by amplifying tube 116. That, in turn, goes back to the time when the photo-tube 118 is affected to energize the amplifying tube 116; and the critical action of the photo-tube, in turn, depends upon the time when the vibrating reed sweeps across the guide line by intercepting the beam first on one side thereof and then on the other.

Thus the guide line is the time changing line, to control the sequence between resistor 131 and rectifier 136. The photo-tube illumination will be modified every time the guide line is engaged by a light beam from the vibrating lens. When the equipment is first installed, the vibrating lens system is initially set up and located physically with respect to the desired path of the guide line, so that the guide line in its proper normal neutral path will be engaged by a light beam, and an impulse peaking voltage established, at the instant corresponding to the 90° point on the positive or negative wave of the main circuit voltage, as shown in Fig. 11. The beam from the lens when moving in one direction will engage the guide line at the instant corresponding to the time of the mid-point of positive waves and the beam from the lens when moving in the opposite direction will engage the line at the mid-point of the negative waves, when the guide line is in neutral position. For simplicity, such beams will be identified as the positive beam and as the negative beam.

When a positive beam scans or strikes the guide line in proper position, a peaking voltage impulse 170 is generated at the instant of the 90° point of the positive voltage wave in Fig. 17. Similarly, when a negative beam strikes the guide line in proper position, a peaking impulse 171 will be generated at the instant of the 90° point of the negative voltage wave, as in Fig. 17.

When a positive or negative beam strikes the guide line off normal position, either ahead of or behind the normal instant, the peaking voltage will be generated correspondingly ahead of or behind the 90° instant.

If a positive or a negative beam strikes the guide line ahead of normal position, the peak impulse 172 or 173 will be generated ahead of the 90° instant of the positive or of the negative wave, as in Fig. 17b. Thus, the position of the peak impulse relative to the 90° instant of each voltage wave is determined by the time when a beam strikes the guide line.

The rectified voltage 174 derived from the rectifier bridge 136 is always at the 90° point of both waves, as shown in Fig. 18a and Fig. 18b. The position of the peak voltage impulse relative to the rectifier voltage is therefore also determined by the time when a beam strikes the guide line relative to its normal neutral position.

It will aid in the understanding of this system to consider the neutral position of the guide line as the extreme left-hand edge of the right-hand zone along the guide line path.

Thus, when a positive beam strikes the guide line anywhere on the left-hand side of the neutral position, the resulting critical response of the photocell will cause the peaking voltage impulse to energize and start tube 130 in time to energize resistor 131 and to prevent tube 132 from operating during the positive wave, when the tubes 130 and 132 will normally be available for operation. In that case, resistor 131 is energized ahead of the 90° instant, as shown by resistor voltage drop 176 in Fig. 19b.

When a positive beam strikes the guide line in neutral position, or to the right of neutral position, tube 130 will not be started in time to energize resistor 131 and to prevent tube 132 from operating in response to the voltage of rectifier 136. Tube 132 will therefore, start operating in response to applied voltage and grid excitation by rectifier 136. That relationship is illustrated by the delayed resistor drop 176 in Fig. 19a, where the voltage across the resistor 131 is behind the 90° point, at which the rectifier has already become effective.

Thus, when the guide line is to the left of neutral position, tube 130 will start operating first; but when the guide line is on neutral position or to the right of neutral position, tube 132 will start first, when a positive beam strikes the guide line.

When a negative beam strikes the guide line, neither tube 130 nor 132 will operate since their anodes are negative at that time. When tube 132 operates, it energizes and controls the impedance of the impedance device 133 whose primary winding is connected in the plate circuit of tube 132. That impedance device controls a second split-phase circuit to control the energization of the restoral motor 140.

We may now consider the second split-phase circuit connected to the secondary winding 111-f. That circuit includes a resistor 154 as one branch, and the secondary or alternating current winding 133-b of the impedance device 133, as the other branch. The primary or direct current winding 133-a of the impedance device 133 is connected in the plate circuit of the discharge tube 132 and is bridged by a condenser 139 to maintain the winding energized to sustain the saturation of the impedance 133 for an extended interval.

The impulse transformer 144, connected to this split-phase circuit, is energized by the voltage between the mid-point of the transformer secondary 111-f and the juncture point between the resistor 154 and the reactor secondary 133-b. As the reactance of the secondary winding 133-b is varied, the phase position of the voltage supplied to the impulse transformer 144 is shifted.

When tube 132 conducts current and energizes the primary winding of impedance 133, the magnetic circuit of the impedance becomes saturated and reduces the impedance of the secondary winding 133-b to a minimum value. When tube 132 does not conduct current, the impedance of the secondary winding 133-b is at its maximum value. The impedance of secondary winding 133-b is thus varied from a maximum value when tube 132 is not conducting, to a minimum value when tube 132 is conducting.

As the impedance of the secondary winding 133-b is varied, the phase relation of the phase-displaced voltage to the primary of the impulse transformer 144 is varied, and the restoral tubes correspondingly controlled to energize the restoral motor. The voltage to the impulse transformer 144 may thus be shifted through a substantial angle in excess of 90° and to substantially 180°. Its action on the restoral tubes may now be considered.

As the polarity of the terminals of secondary transformer winding 111-e changes, the restoral tubes 142 and 143 alternately are of proper polarity to be available for conducting the current waves of the corresponding polarities to the motor armature. If, while either tube is available for conductivity, its grid is given a positive potential, relative to its cathode, by a positive wave of the impulse transformer 144, that tube will be rendered conductive. The other tube will be nonconductive at that time, however, since its anode is negative. Thus, one tube will transmit a full wave impulse of one polarity to energize the motor armature to start restoral movement. If complete restoral is not effected within that cycle, the same tube will be conductive to transmit the next succeeding wave of the same polarity. Such action will continue until restoral is completed.

The operation is thus such that neither tube transmits current while the guide line is in proper position. When the guide line is off normal position, either one tube 142 or the other tube 143 will pass its maximum current.

During the negative wave from the impulse transformer 144, both grids will be negative and neither restoral tube will transmit current to the restoral motor.

The two rectifiers 147 and 148 to which the impulse transformer 144 is connected serve to provide a low resistance connection to either cathode at proper polarity.

Thus, while the guide line is off normal position, the restoral tubes will be selectively energized to transmit current waves of proper polarity to operate the motor to nullify the deviation. The selective action is established by the phase-shifting of the voltage from the impulse transformer 144 upon the grids of the restoral tubes 142 and 143, in response to variation of the impedance value of secondary winding 133-b of impedance 133.

As shown in Fig. 20a, the current through control tube 132 starts with the voltage of rectifier 136, when not blocked by resistor 131, and energizes coil 133-a to saturate the reactor and keep it saturated for an interval of 360°. During the cycle when tube 130 is energized, but not tube 132, the reactor flux diminishes, since winding 133-a is no longer energized, and increases the impedance of the winding 133-b in the split-phase circuit. Such flux variation controls the impedance value of the secondary winding of the impedance device 133, and in turn controls the phase position of the secondary voltage of the impulse transformer 144, as shown in Fig. 21.

By means of such selective action between tubes 130 and 132 according to the time when the light beams strike the guide line, and by means of the phase-control of the restoral tubes, the restoral motor is selectively controlled to correct deviation as detected by a single photo-cell.

While I refer to such correction as being proportional to the deviation, it is not an exact proportionality but rather the correction is a function of the deviation.

The use of a single photo-cell simplifies the system by depending upon the responses of a single cell and thereby obviates the necessity for balancing cooperating tubes. The application of the system in the field is thereby simplified.

My invention is not limited to any of the particular devices or structures, or details of construction, as illustrated, nor to any specific arrangement that is shown since they may be modified and rearranged without departing from the spirit and scope of my invention as set forth in the appended claims.

I claim as my invention:

1. In a register control system for a traveling web of sheet material having an index line thereon and in which a regulating means automatically moves said sheet material so as to maintain said index line at a definite relative position, in combination, control means comprising a photo-tube, a light source whose rays first strike said sheet material on and adjacent said index line and then strike said photo-tube, polarized synchronizing apparatus comprising, in combination, a reed, an alternating current source, magnetic means energized by said source, rectifier means in circuit relationship with said magnetic means and source and effective to cause vibration of said reed at a frequency corresponding to that of said source, said reed being adapted to move across the light beam issuing from said lamp and to sweep across said beam from one side to the other, periodically, of said index line, the relative position at which said index line is crossed being a control indication of the direction and magnitude of correction which must be imposed in order to maintain the index line in its normal position.

2. In a register control system for a traveling web of sheet material having an index line thereon and in which a regulating means automatically moves said sheet material so as to maintain said index line at a definite relative position, in combination, control means comprising a photo-tube, a light source whose rays first strike said sheet material on and adjacent said index line and then strike said photo-tube, polarized synchronizing apparatus comprising, in combination, a reed, an alternating current source, an electromagnet energized by said source, a half-wave rectifier connected in series with said electromagnet and source and effective to cause vibration of said reed at a frequency corresponding to that of said source said reed being adapted to move across the light beam issuing from said lamp and to sweep across said beam from one side to the other, periodically, of said index line, the relative position at which said index line is crossed being a control indication of the direction and magnitude of correction which must be imposed in order to maintain the index line in its normal position.

3. In a register control system for a traveling web of sheet material having an index line thereon and in which a regulating means automatically moves said sheet material so as to maintain said index line at a definite relative position, in combination, control means comprising a photo-tube, a light source whose rays first strike said sheet material on and adjacent said index line and then strike said photo-tube, polarized synchronizing apparatus comprising, in combination, a reed, an alternating current source, a pair of electromagnets disposed on opposite sides of said reed and connected in parallel with said source, a pair of oppositely directed half-wave rectifiers, each of which is connected in one of said parallel circuits in series with one of said electromagnets thereby causing said reed to vibrate with the same frequency as said alternating current source, said reed being adapted to move across the light beam issuing from said lamp and to sweep across said beam from one side to the other, periodically, of said index line, the relative position at which said index line is crossed being a control indication of the direction and magnitude of correction which must be imposed in order to maintain the index line in its normal position.

FINN H. GULLIKSEN.